United States Patent
Cohen et al.

(10) Patent No.: US 9,367,833 B2
(45) Date of Patent: Jun. 14, 2016

(54) DATA SERVICES OUTSOURCING VERIFICATION

(75) Inventors: Alexander J. Cohen, Bellevue, WA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: Invention Science Fund I, LLC, Bellevue, WA (US)

(*) Notice: Subject to any disclaimer, the term of this patent is extended or adjusted under 35 U.S.C. 154(b) by 160 days.

(21) Appl. No.: 13/135,801

(22) Filed: Jul. 14, 2011

(65) Prior Publication Data

US 2013/0019095 A1    Jan. 17, 2013

(51) Int. Cl.
*H04L 29/06* (2006.01)
*G06Q 20/00* (2012.01)
*G06Q 20/02* (2012.01)
*H04L 9/32* (2006.01)

(52) U.S. Cl.
CPC .......... *G06Q 20/00* (2013.01); *G06Q 20/02* (2013.01); *H04L 9/3247* (2013.01); *H04L 9/3263* (2013.01); *H04L 2209/38* (2013.01); *H04L 2209/56* (2013.01)

(58) Field of Classification Search
CPC ..... G06Q 20/00; G06Q 20/02; G06Q 20/401; G06Q 20/389; H04L 9/3247; H04L 9/3263; H04L 9/3297; H04L 9/3236; H04L 9/3265; H04L 9/3242; H04L 9/3255; H04L 2209/38; H04L 2209/56; H04L 2209/60; H04L 2209/603

USPC .......................................... 713/164
See application file for complete search history.

(56) References Cited

U.S. PATENT DOCUMENTS

| 4,630,201 | A | * | 12/1986 | White | 705/44 |
| 5,671,279 | A | * | 9/1997 | Elgamal | 705/79 |
| 5,677,955 | A | * | 10/1997 | Doggett et al. | 705/76 |
| 5,850,442 | A | * | 12/1998 | Muftic | 705/65 |
| 6,188,993 | B1 | * | 2/2001 | Eng et al. | 705/37 |
| 6,237,096 | B1 | * | 5/2001 | Bisbee et al. | 713/178 |
| 6,553,129 | B1 | | 4/2003 | Rhoads | |

(Continued)

OTHER PUBLICATIONS

SAP Sybase IQ, 'Securing Your Valuable Data Assets, Using the Advanced Security Option of SAP® Sybase® IQ', SAP AG, 2013, entire document, http://a248.g.akamai.net/n/248/420835/9806ff 1811ac6690a70125ddd942fa76375c2d568c91eb996472a1c410af9 dec/sapasset.download.akamai.com/420835/sapcom/docs/2013/08/ 2ea25ead-517c-0010-82c7-eda71af511fa.pdf.*

(Continued)

*Primary Examiner* — Luu Pham
*Assistant Examiner* — Ronald Baum (57) ABSTRACT

A method and system for verifying outsource data and providing a certification system includes but is not limited to a method including receiving one or more deposits of one or more data elements in connection with an outsourcing transaction from or on behalf of a third party, verifying an identification of the third party, maintaining a transaction log to provide a validation record acknowledging receipt of the one or more deposits, and performing a cryptographic action against one or more aspects of the outsourcing transaction to provide a certified version of the transaction log to confirm the outsourcing transaction.

37 Claims, 8 Drawing Sheets

(56) References Cited

U.S. PATENT DOCUMENTS

| | | | |
|---|---|---|---|
| 6,587,945 B1 | 7/2003 | Pasieka | |
| 6,647,128 B1 | 11/2003 | Rhoads | |
| 6,658,568 B1 * | 12/2003 | Ginter et al. | 713/193 |
| 6,856,975 B1 * | 2/2005 | Inglis | 705/51 |
| 7,035,427 B2 | 4/2006 | Rhoads | |
| 7,194,623 B1 | 3/2007 | Proudler et al. | |
| 7,209,889 B1 * | 4/2007 | Whitfield | 705/14.39 |
| 7,441,249 B2 * | 10/2008 | Adachi | G06Q 10/0633 703/1 |
| 7,720,764 B2 * | 5/2010 | Emerson et al. | 705/44 |
| 7,801,826 B2 * | 9/2010 | Labrou et al. | 705/67 |
| 8,041,797 B2 * | 10/2011 | Childress | G06Q 10/06 370/254 |
| 8,170,897 B1 * | 5/2012 | Cohen | G06Q 10/06 705/7.13 |
| 8,271,804 B2 * | 9/2012 | Kudo | 713/193 |
| 8,468,126 B2 * | 6/2013 | van Gent et al. | 707/610 |
| 8,510,263 B2 * | 8/2013 | Essawi et al. | 707/607 |
| 2001/0002485 A1 * | 5/2001 | Bisbee et al. | 713/167 |
| 2002/0002541 A1 | 1/2002 | Williams | |
| 2003/0081790 A1 | 5/2003 | Kallahalla et al. | |
| 2003/0135385 A1 | 7/2003 | Karpoff | |
| 2003/0163684 A1 * | 8/2003 | Fransdonk | 713/153 |
| 2003/0225638 A1 | 12/2003 | Secola | |
| 2003/0233258 A1 | 12/2003 | Cottrell et al. | |
| 2004/0022444 A1 | 2/2004 | Rhoads | |
| 2004/0064351 A1 * | 4/2004 | Mikurak | G06Q 10/087 705/22 |
| 2004/0103284 A1 | 5/2004 | Barker | |
| 2004/0164149 A1 | 8/2004 | Roberts | |
| 2004/0236748 A1 | 11/2004 | Coltrera | |
| 2005/0066237 A1 | 3/2005 | Greenwald et al. | |
| 2005/0182956 A1 * | 8/2005 | Ginter et al. | 713/193 |
| 2005/0216360 A1 | 9/2005 | Osterer | |
| 2005/0216421 A1 * | 9/2005 | Barry | G06F 11/0709 705/64 |
| 2005/0228832 A1 | 10/2005 | Ghotge et al. | |
| 2005/0267822 A1 | 12/2005 | Mead | |
| 2006/0057960 A1 | 3/2006 | Tran | |
| 2006/0090057 A1 | 4/2006 | Saliba | |
| 2006/0178902 A1 | 8/2006 | Vicars et al. | |
| 2006/0179155 A1 | 8/2006 | Bunting et al. | |
| 2006/0188128 A1 | 8/2006 | Rhoads | |
| 2006/0200508 A1 | 9/2006 | Telkowski et al. | |
| 2006/0204211 A1 | 9/2006 | Morohoshi et al. | |
| 2007/0021970 A1 | 1/2007 | Schreter | |
| 2008/0120129 A1 * | 5/2008 | Seubert et al. | 705/1 |
| 2009/0091991 A1 * | 4/2009 | Cho | G11C 11/5628 365/189.16 |
| 2009/0254971 A1 * | 10/2009 | Herz et al. | 726/1 |
| 2010/0070765 A1 * | 3/2010 | Ogg | 713/168 |
| 2010/0199089 A1 * | 8/2010 | Vysogorets et al. | 713/168 |
| 2010/0217994 A1 * | 8/2010 | Ginter et al. | 713/176 |
| 2011/0035287 A1 * | 2/2011 | Fox | 705/14.69 |

OTHER PUBLICATIONS

Carnut, M.A., et al, 'FreeICP.ORG: Free Trusted Certificates by Combining the X.509 Hierarchy and the PGP Web of Trust Through a Collaborative Trust Scoring System', Apr. 2003, freeicp.org, entire document, http://www.postcogito.org/PublicationsInEnglish/pki03-v15.pdf.* http://www.thuriam.com/Data-Capture-Capture.html.

* cited by examiner

DATA SERVICES OUTSOURCING VERIFICATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 11/606,779, entitled DATA SERVICES OUTSOURCING VERIFICATION, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene as inventors, filed Nov. 30, 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

The present application relates generally to outsourced data services.

SUMMARY

In one aspect, a method for verifying outsource data includes but is not limited to receiving one or more deposits of one or more data elements in connection with an outsourcing transaction from or on behalf of a third party; verifying an identification of the third party; maintaining a transaction log to provide a validation record acknowledging receipt of the one or more deposits; and performing a cryptographic action against one or more aspects of the outsourcing transaction to provide a certified version of the transaction log to confirm the outsourcing transaction. In addition to the foregoing, other method aspects are described in the claims, drawings, and text forming a part of the present application.

In another aspect, a computer program product includes but is not limited to a signal bearing medium bearing at least one of one or more instructions for receiving one or more deposits of one or more data elements in connection with an outsourcing transaction from or on behalf of a third party; one or more instructions for verifying an identification of the third party; one or more instructions for maintaining a transaction log to provide a validation record acknowledging receipt of the one or more deposits; and one or more instructions performing a cryptographic action against one or more aspects of the outsourcing transaction to provide a certified version of the transaction log to confirm the outsourcing transaction. In addition to the foregoing, other computer program product aspects are described in the claims, drawings, and text forming a part of the present application.

In one aspect, a method for verifying outsource data includes but is not limited to depositing one or more data elements to an outsourcing service in one or more transactions; providing one or more identification elements to validate the deposit; and receiving a record of the deposit of the one or more data elements, the record including a cryptographic digital fingerprint traceable to the one or more identification elements.

In another aspect, a computer program product includes but is not limited to a signal bearing medium bearing at least one or more instructions for depositing one or more data elements to an outsourcing service in one or more transactions; one or more instructions for providing one or more identification elements to validate the deposit; and one or more instructions for receiving a record of the deposit of the one or more data elements, the record including a cryptographic digital fingerprint traceable to the one or more identification elements.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a certification system for verifying one or more data elements in connection with an outsourcing transaction includes but is not limited to a processor; a memory coupled to the processor; a storage facility accessible by the processor, the storage facility configured to store one or more deposits of the one or more data elements in connection with the outsourcing transaction from or on behalf of a third party; a database coupled to the processor, the database configured to maintain a transaction log to provide a validation record acknowledging receipt of the one or more deposits; a verification module coupled to the processor, the verification module configured to verify an identification of the third party; and a cryptographic module coupled to the processor, the cryptographic module configured to perform a cryptographic action against one or more aspects of the outsourcing transaction to provide a certified version of the transaction log. In addition to the foregoing, other certification system aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

Figure 1:
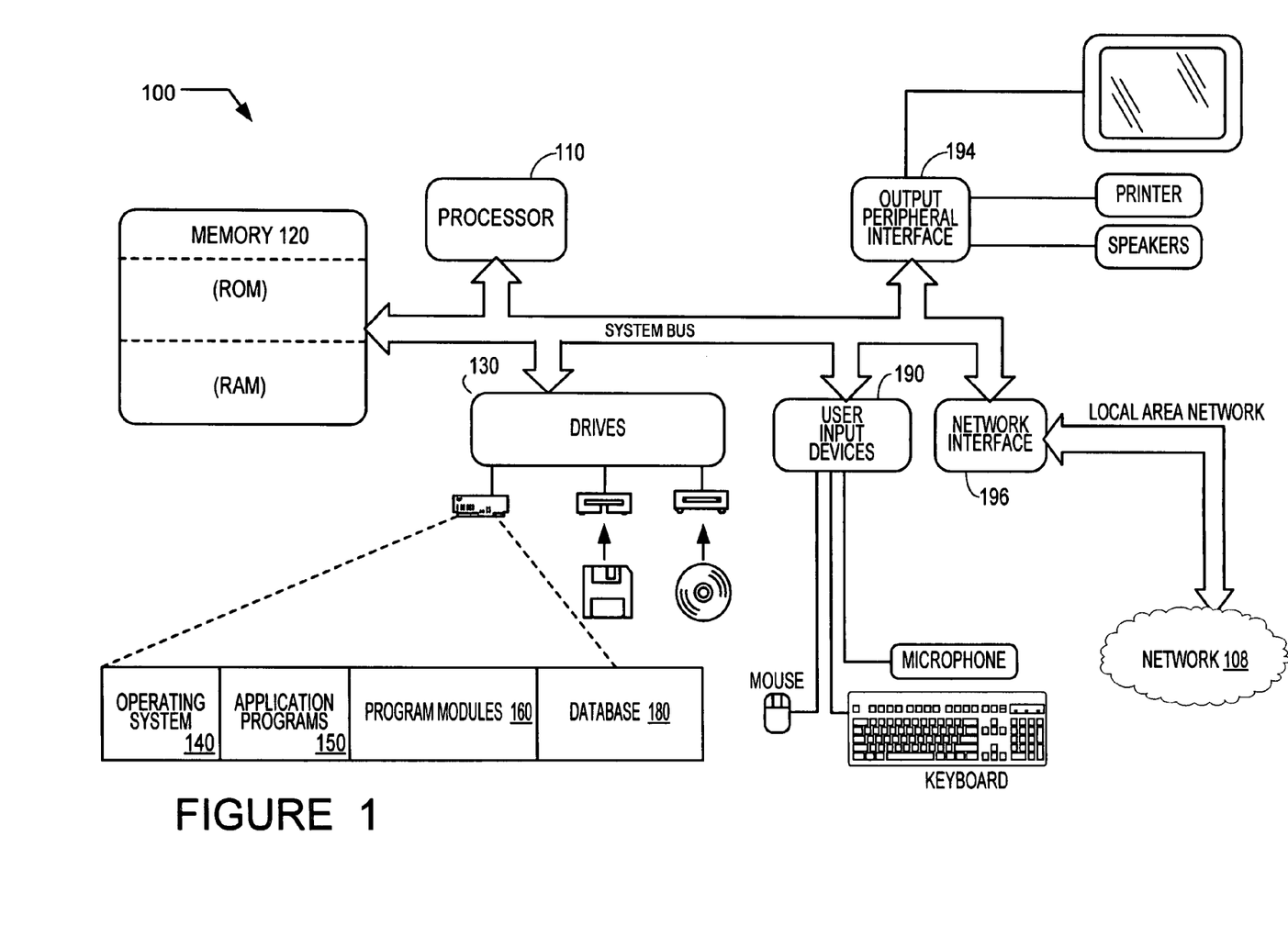
FIG. 1 is a block diagram of an exemplary computer architecture that supports the claimed subject matter of the present application.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, and database 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108 It will be appreciated that other means of establishing a communications link between the computers may be used.

According to one embodiment, computer 100 is connected in a networking environment such that the processor 110 and/or program modules 160 can perform with or as a certification system module in accordance with embodiments herein.

Figure 2:
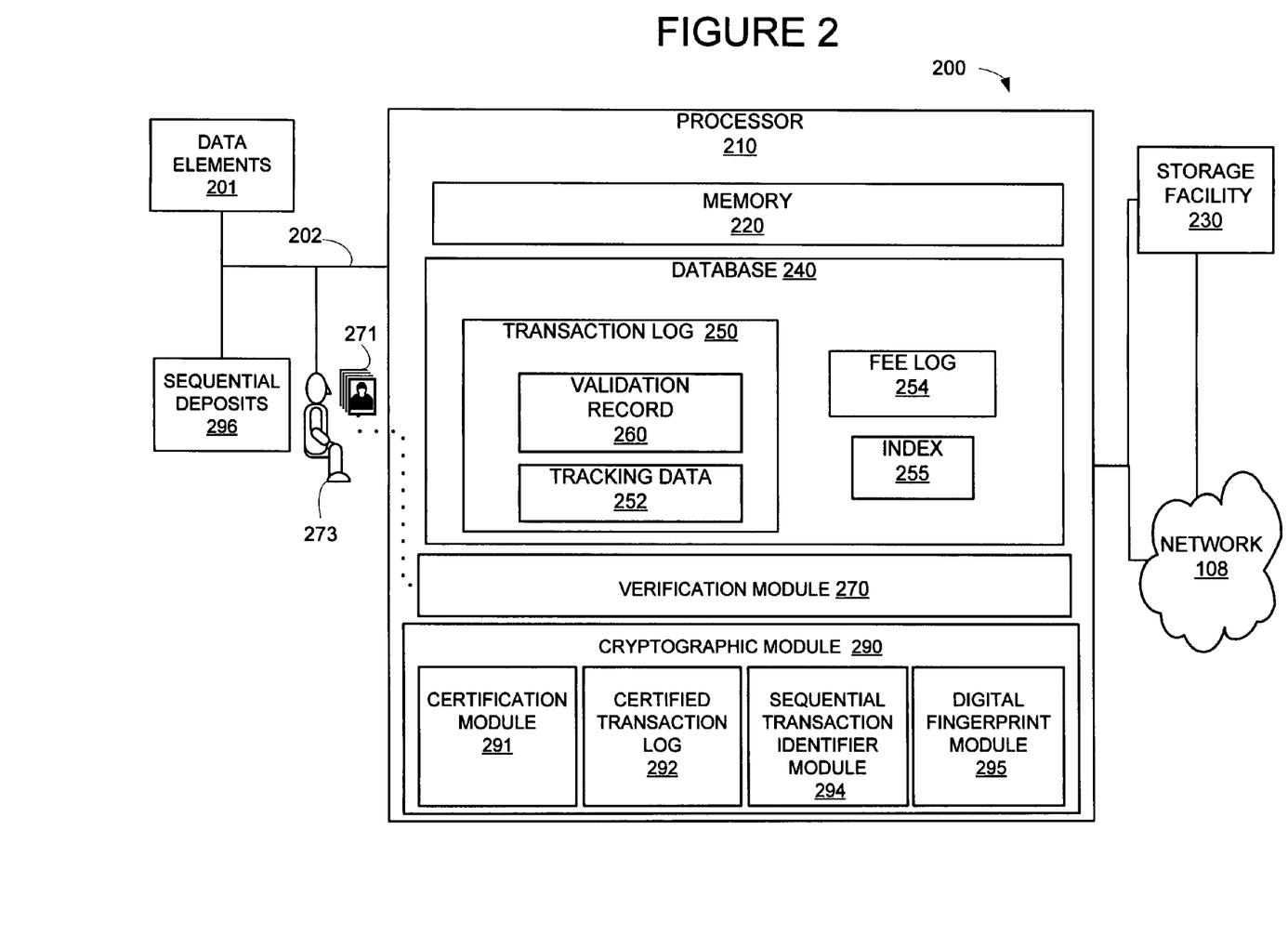
FIG. 2 is a block diagram of an exemplary certification system that supports the claimed subject matter of the present application.

Referring now to FIG. 2, illustrated is an exemplary block diagram for an embodiment of a certification system 200 that can be configured for verifying one or more data elements 201 in connection with an outsourcing transaction 202. As shown, certification system 200 includes a processor 210, and a memory 220 coupled to the processor 210. FIG. 2 also illustrates a storage facility 230 accessible by processor 210 and by network 108 (see FIG. 1). Storage facility 230 is configured to store deposits of the data elements 201 in connection with the outsourcing transaction 202. The outsourcing transaction 202 can be from or on behalf of a third party 273, who can choose to deposit data elements 201 and/or sequential deposits 296 and/or a combination of data elements 201 and sequential deposits 296.

FIG. 2 also illustrates a database 240 coupled to the processor 210. Database 240 is configured to maintain a transaction log 250. The transaction log 250 is configured to provide a validation record 260 acknowledging receipt of the deposits of data elements 201. In one embodiment, database 240 includes a fee log 254 for maintaining a log for purposes of assessing a fee. The fee can be associated with transactions recorded in transaction log 250 or can be according to other metrics for associating a fee with outsourced data as will be appreciated by one of skill in the art with the benefit of the present disclosure. Database 240 further illustrates index 255. According to an embodiment, database 240 can be configured to generate index 255 to associate a record of deposit to establish a deposit history. For example, index 255 could benefit a third party 273 who wishes to check a deposit history. Further, index 255 could be configured to enable pricing via fee log 254 and used in conjunction with fee log 254 to establish fees. In another embodiment, wherein certification system 200 is used as a third party registry service, index 255 could be configured to index transactions and determine a fee as a function of an amount of data included in the one or more deposits, such as deposits of data elements 201 and/or sequential deposits 296.

Transaction log 250 is also shown including tracking data 252 to confirm the outsourcing transaction 202. Tracking data 252 can also be configured as metadata for the transaction log 250. Different types of tracking data can be used for different types of outsourced data 201. For example, the types of tracking data 252 can include but not be limited to data appropriate for the type of deposit. For example, if photographs are deposited, the tracking data 252 can include the date a photograph was taken or if software code is deposited the tracking data 252 can include a latest revision date of the software code. In one embodiment, the outsource service can include a copyright maintenance service wherein the tracking data 252 insures that the latest copyrightable material is logged for purposes of litigation or copyright protection.

FIG. 2 further illustrates modules that can be implemented as program modules 160, as shown in FIG. 1. Specifically, FIG. 2 illustrates a verification module 270 coupled to processor 210. Verification module 270 is configured to receive and verify the identity 271 of a third party 273. Processor 210 is coupled to cryptographic module 290. Cryptographic module 290 includes a certification module 291 configured to perform one or more of a check function and/or a hash function checksum and/or hash of the deposits for storage and/or transaction log 250. Cryptographic module 290 is configured to perform a cryptographic action against aspects of the outsourced transaction 202 to provide a certified version of the transaction log 250, shown as certified transaction log 292. In one embodiment, cryptographic module 290 includes a digital fingerprint module 295 for creating a digital fingerprint of any deposit, such as a deposit of data elements 201 or a series of deposits, such as sequential deposits 296.

Cryptographic module 290 is also illustrated as including certified transaction log 292 and sequential transaction identifier module 294. Sequential transaction identifier module 294 is configured to certify sequential deposits 296 associated with the transaction log 250. In one embodiment, sequential transaction identifier module 294 is configured to enable tracking and/or validation of sequential deposits 296.

In one embodiment, transaction log 250 becomes the certified transaction log 292, and is configured with certification module 291 to perform one or more of a hash of at least one of the data elements 201 and/or sequential deposits 296, a secret key encryption of at least one of the data elements 201 and/or sequential deposits 296, and/or a public key encryption of at least one of the data elements 201 and/or sequential deposits 296. Certification module 291 can also operate with digital fingerprint module 295 to impose a digital fingerprint on certified data as necessary in accordance with system requirements.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Referring now to FIGS. 3A, 3B, 3C and 3D, an exemplary flow diagram illustrates the operation of a certification system for receiving data as part of an outsourcing transaction according to an embodiment.

Figure 3A:
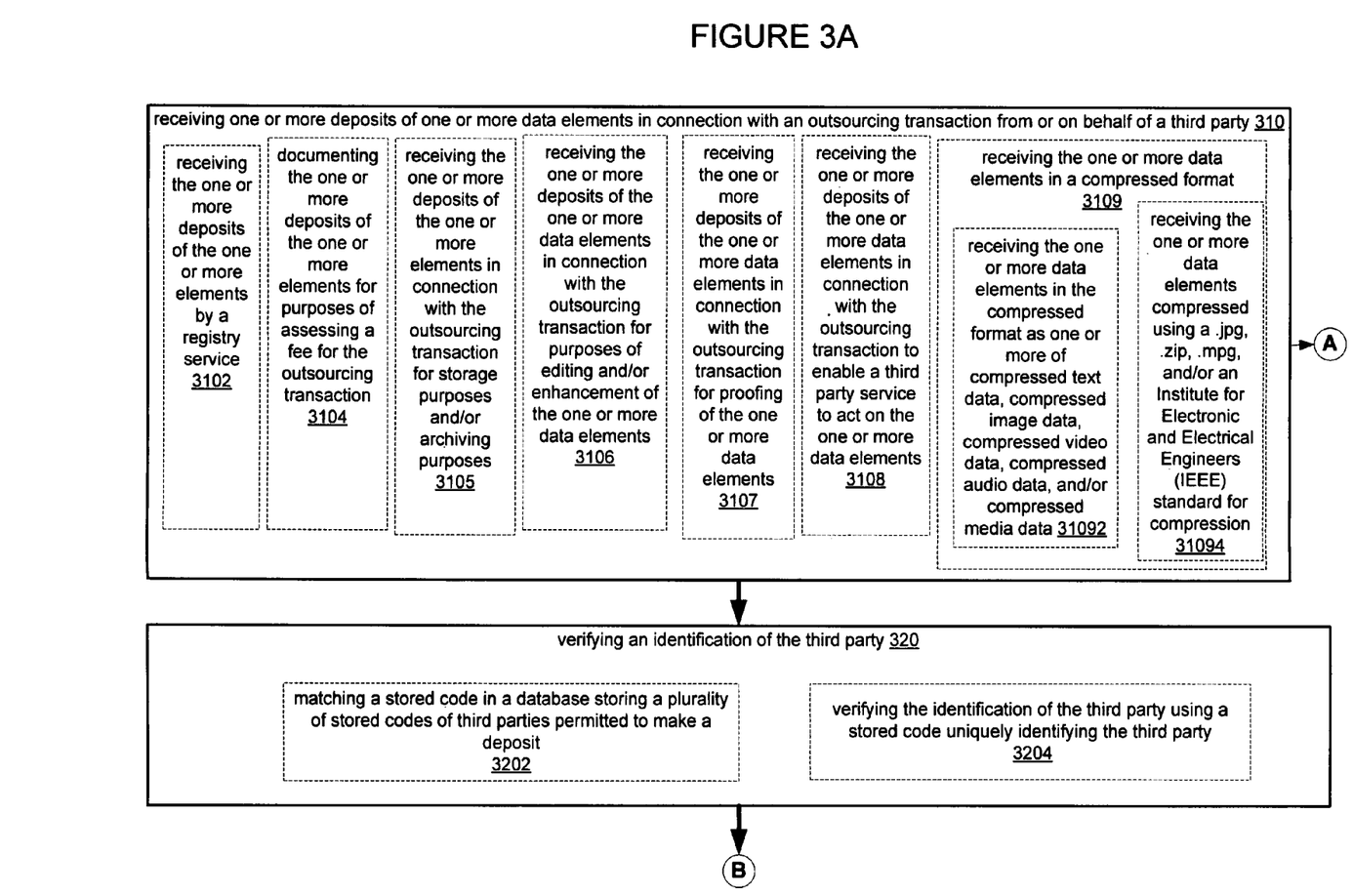
FIGS. 3A, 3B, 3C and 3D illustrate a flow diagram of an exemplary method in accordance with an embodiment of the subject matter of the present application.

As illustrated in FIG. 3A, block 310 provides for receiving one or more deposits of one or more data elements in connection with an outsourcing transaction from or on behalf of a third party 273 (e.g., certification system 200 receiving data elements 201 on behalf of third party 273). Depicted within block 310 is optional block 3102, which provides for receiving the one or more deposits of the one or more elements by a registry service (e.g. certification system 200 operating as a registry service to receive data elements 201). Also depicted within block 310 is optional block 3104 which provides for documenting the one or more deposits of the one or more elements for purposes of assessing a fee for the outsourcing transaction (e.g., database 240 and/or fee log 254 documenting deposits into data base 240 for assessing a fee). Also depicted within block 310 is optional block 3105 which provides for receiving the one or more deposits of the one or more elements in connection with the outsourcing transaction for storage purposes and/or archiving purposes (e.g., database 240 operating as an archive and/or storage place for outsourcing transaction 202; and/or storage facility 230 operating as an archive and/or storage place).

Also depicted within block 310 (see FIG. 3A) is optional block 3106 which provides for receiving the one or more deposits of the one or more data elements in connection with the outsourcing transaction for purposes of editing and/or enhancement of the one or more data elements (e.g., certification system 200 receiving data elements 201 to preserve the data elements and record the data elements 201). Also depicted within block 310 is optional block 3107 which provides for receiving the one or more deposits of the one or more data elements in connection with the outsourcing transaction for proofing of the one or more data elements (e.g., certification system 200 receiving data elements 201 to enable a user to proof the data elements 201). Also depicted within block 310 is optional block 3108 which provides for receiving the one or more deposits of the one or more data elements in connection with the outsourcing transaction to enable a third party service to act on the one or more data elements (certification system 200 receiving the data elements 201 as part of an outsourcing transaction 202 to enable a third party 273 over a network 108 to act on the data elements 201).

As further illustrated in FIG. 3A, depicted within block 310 is optional block 3109 which provides for receiving the one or more data elements in a compressed format (e.g., certification system 200 receiving data elements 201 in a compressed format). Depicted within block 3109 is optional block 31092 which provides for receiving the one or more data elements in the compressed format as one or more of compressed text data, compressed image data, compressed video data, compressed audio data, and/or compressed media data (e.g. certification system 200 receiving data elements 201 in a compressed format such as text, image, video, audio or other media data). Also depicted within block 3109 is optional block 31094 which provides for receiving the one or more data elements compressed using a .jpg, .zip, .mpg, and/or an Institute for Electronic and Electrical Engineers (IEEE) standard for compression (e.g., certification system 200 receiving data elements 201 that are compressed as .jpg, .zip, .mpg, or other standard).

Figure 3B:
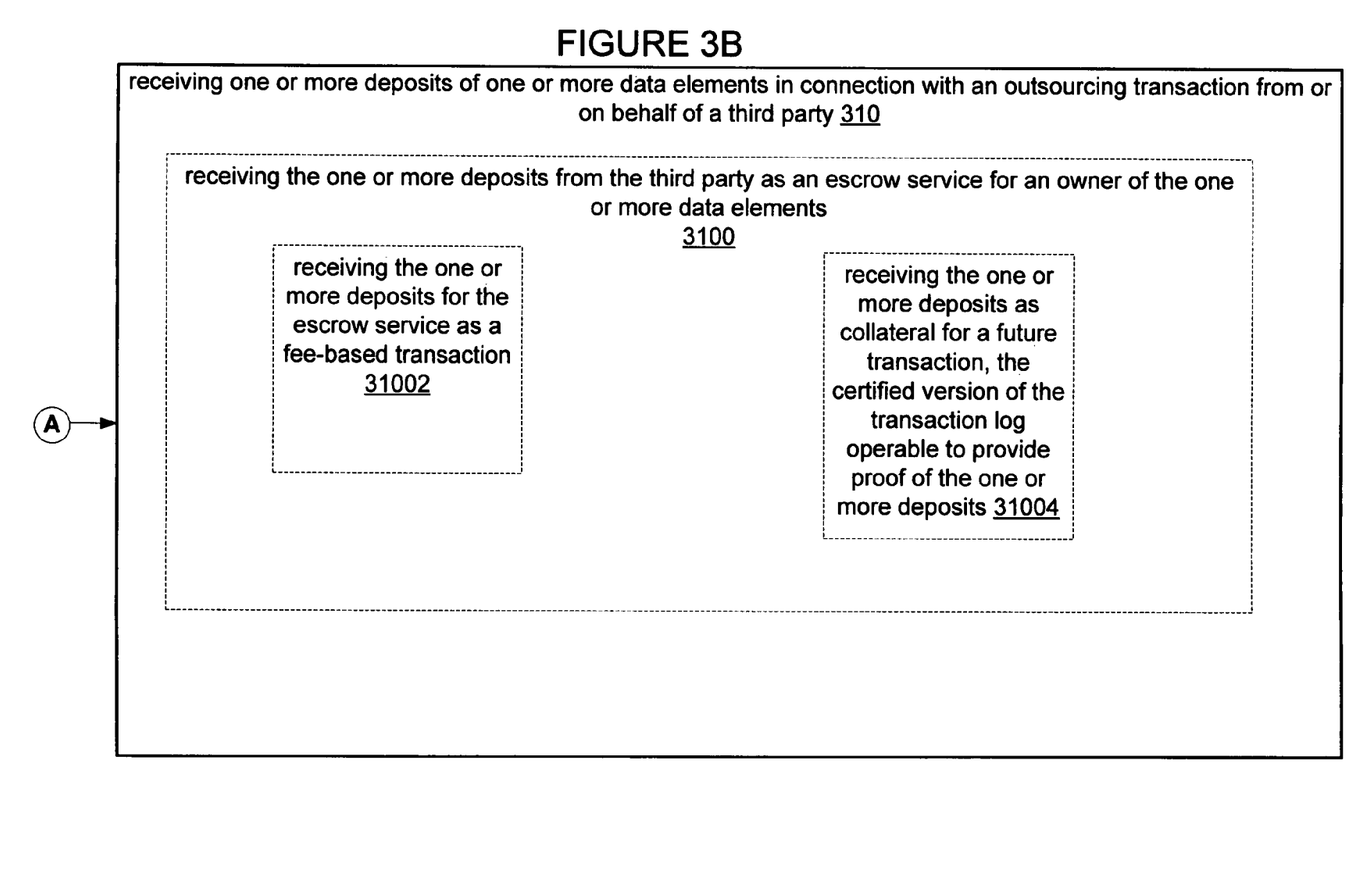

As illustrated in FIG. 3B, block 310 further includes optional block 3100 which provides for receiving the one or more deposits from the third party as an escrow service for an owner of the one or more data elements (e.g., certification system 200 receiving deposits 201 from a third party 273 who can be an owner or an escrow service for the owner). Depicted within optional block 3100 is optional block 31002 which provides for receiving the one or more deposits for the escrow service as a fee-based transaction (e.g., certification system 200 receiving the deposits of data elements 201 as part of a fee-based transaction). Also depicted within optional block 3100 is optional block 31004 which provides for receiving the one or more deposits as collateral for a future transaction, the certified version of the transaction log operable to provide proof of the one or more deposits (e.g., certification system 200 receiving the deposits 201 as collateral for a future transaction like transaction 202 and certified transaction log 292 providing proof of the deposit).

Referring to FIG. 3A, block 320 provides for verifying an identification of the third party 273 (e.g., verification module 270 verifying identification 271). Depicted within block 320 is optional block 3202 which provides for matching a stored code in a database storing a plurality of stored codes of third parties permitted to make a deposit (e.g., verification module 270 matching stored code in database 240, wherein database 240 stores codes of third parties 273 making a deposit 201). The stored code can include identification 271 data of the third parties 273 or other matchable code to authorize third parties 273. Also depicted within block 320 is optional block 3204 which provides for verifying the identification of the third party using a stored code uniquely identifying the third party 273 (e.g., verification module 270 verifying identification 271 using stored code in database 240).

Figure 3C:
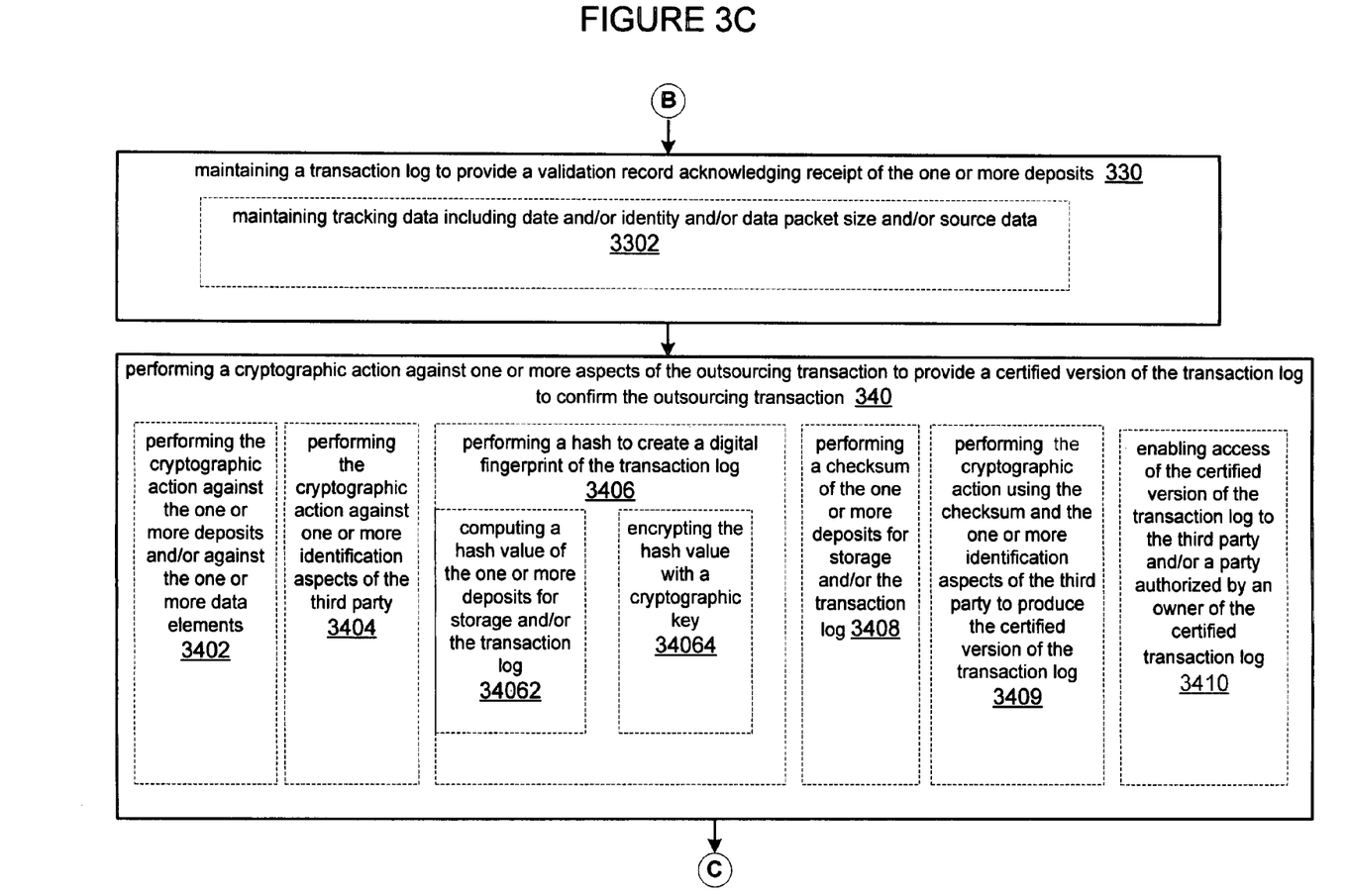

As illustrated in FIG. 3C, block 330 provides for maintaining a transaction log to provide a validation record acknowledging receipt of the one or more deposits (e.g., certification system 100 maintaining transaction log 250 to provide validation record 260 of deposits of data elements 201). Depicted within block 330 is optional block 3302 which provides for maintaining tracking data including date and/or identity and/or data packet size and/or source data (e.g. certification system 100 maintaining tracking data 252 wherein tracking data 252 can include date, identity, data packet size or source data).

Referring to FIG. 3C, block 340 provides for performing a cryptographic action against one or more aspects of the outsourcing transaction to provide a certified version of the transaction log to confirm the outsourcing transaction (e.g., cryptographic module 290 performing a cryptographic action against outsourcing transaction 202 to provide a certified transaction log 292). Depicted within block 340 is optional block 3402 which provides for performing the cryptographic action against the one or more deposits and/or against the one or more data elements (e.g., cryptographic module 290 performing a cryptographic action against deposits and/or data elements 201). Depicted within block 340 is optional block 3404 which provides for performing the cryptographic action against one or more identification aspects of the third party 273 (e.g., cryptographic module 290 performing the cryptographic action against identification 271).

Depicted within block 340 is optional block 3406 which provides for performing a hash to create a digital fingerprint of the transaction log (e.g., cryptographic module 290 performing a hash to create a digital fingerprint using digital fingerprint module 295). Depicted within block 3406 is optional block 34062 which provides for computing a hash value of the one or more deposits for storage and/or the transaction log (e.g., cryptographic module 290 computing a hash value of one or more deposits 201 for storage and/or a hash of transaction log 250). Also depicted within block 3406 is optional block 34064 which provides for encrypting the hash value with a cryptographic key (e.g., cryptographic module 290 encrypting the hash value with a key).

As further illustrated in FIG. 3C, depicted within block 340 is optional block 3408 which provides for performing a checksum of the one or more deposits for storage and/or the transaction log (e.g., cryptographic module 290 performing a checksum of deposits 201 or transaction log 250 or certified transaction log 292). Also depicted within block 340 is optional block 3409 which provides for performing the cryptographic action using the checksum and the one or more identification aspects of the third party to produce the certified version of the transaction log (e.g., cryptographic module 290 performing a cryptographic action using the checksum of deposits 201 or transaction log 250 in addition to identification 271 to produce certified transaction log 292). Also depicted within block 340 is optional block 3410 which provides for enabling access of the certified version of the transaction log to the third party and/or a party authorized by an owner of the certified version of the transaction log (e.g., certification system 200 enabling access to certified transaction log 292 by network 108 or a third party 273).

Figure 3D:
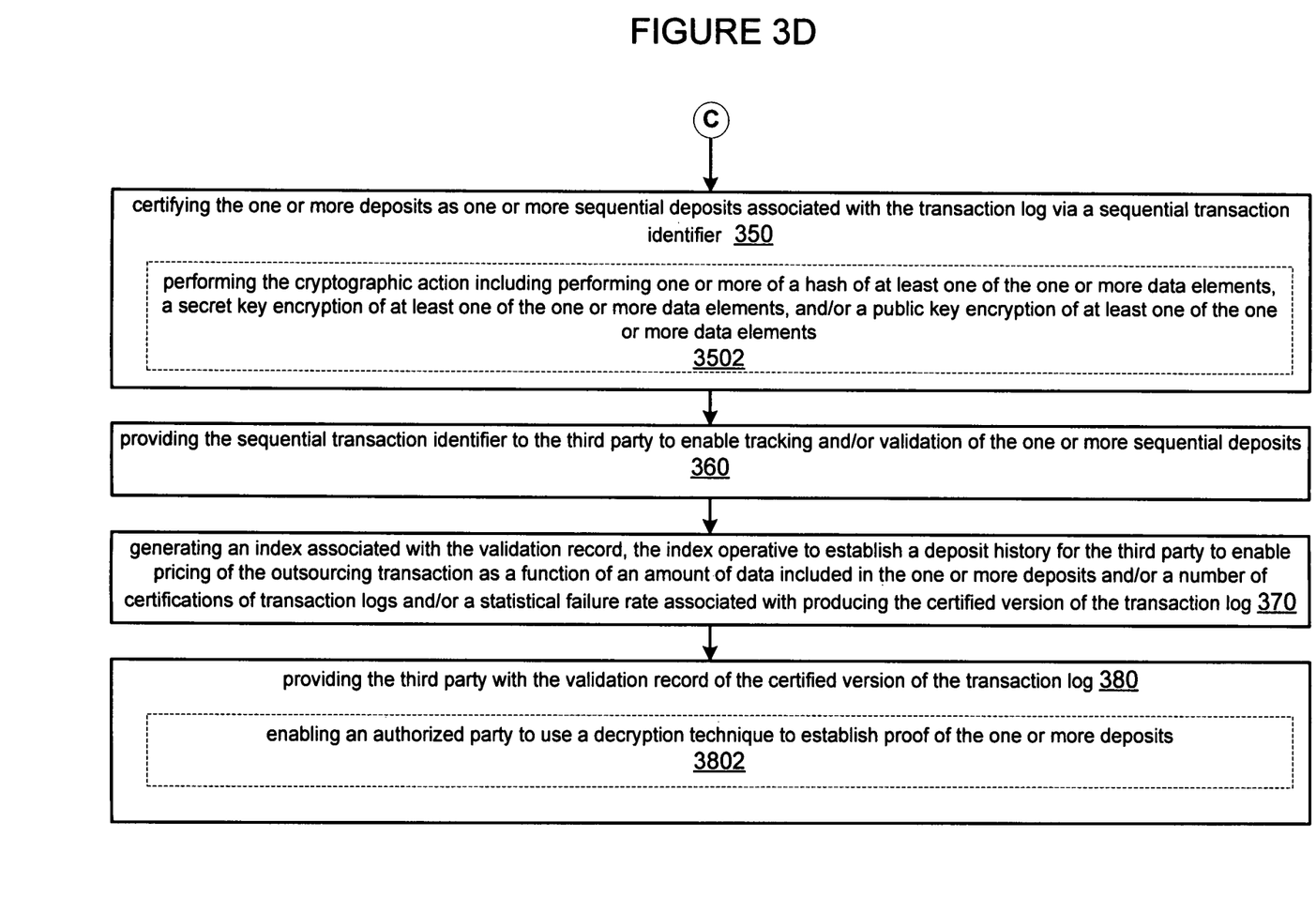

Referring to FIG. 3D, block 350 provides for certifying the one or more deposits as one or more sequential deposits associated with the transaction log via a sequential transaction identifier (e.g., cryptographic module 290 certifying the deposits 201 or 296 using transaction log 250 and sequential transaction identifier module). Depicted within block 350 is optional block 3502, which provides for performing the cryptographic action including performing one or more of a hash of at least one of the one or more data elements, a secret key encryption of at least one of the one or more data elements, and/or a public key encryption of at least one of the one or more data elements (e.g., cryptographic module 290 performing the cryptographic action including a hash of data elements 201 and/or a secret key encryption, and/or a public key encryption of data elements 201).

Block 360 illustrates an aspect for providing the sequential transaction identifier to the third party to enable tracking and/or validation of the one or more sequential deposits (e.g., certification system 200 providing a sequential transaction identifier from sequential transaction identifier module 294 to third party 273 to enable tracking by third party 273 of sequential deposits 296).

As shown in FIG. 3D, block 370 provides for generating an index associated with the validation record, the index operative to establish a deposit history for the third party to enable pricing of the outsourcing transaction as a function of an amount of data included in the one or more deposits and/or a number of certifications of transaction logs and/or a statistical failure rate associated with producing the certified version of the transaction log (e.g., database 240 generating index 255 wherein index 255 is associated with a record of deposit, the index 255 operative to establish a deposit history for the third party 273 to enable pricing via fee log 254 of a third party registry service as a function of an amount of data included in the one or more deposits 201, 296 and/or a number of certifications of transaction logs 292 in cryptographic module 290 and/or a statistical failure rate associated with the certifying performed in cryptographic module 290).

Block 380 illustrates an aspect for providing the third party with the validation record of the certified version of the transaction log (e.g., certification system providing third party 273 with validation record 260 of certified transaction log 292). Depicted within block 380 is optional block 3802 which provides for enabling an authorized party to use a decryption technique to establish proof of the one or more deposits (e.g., enabling third party 273 or a party via network 108 to use a decryption technique to establish proof of deposits 201 or 296).

Figure 4A:
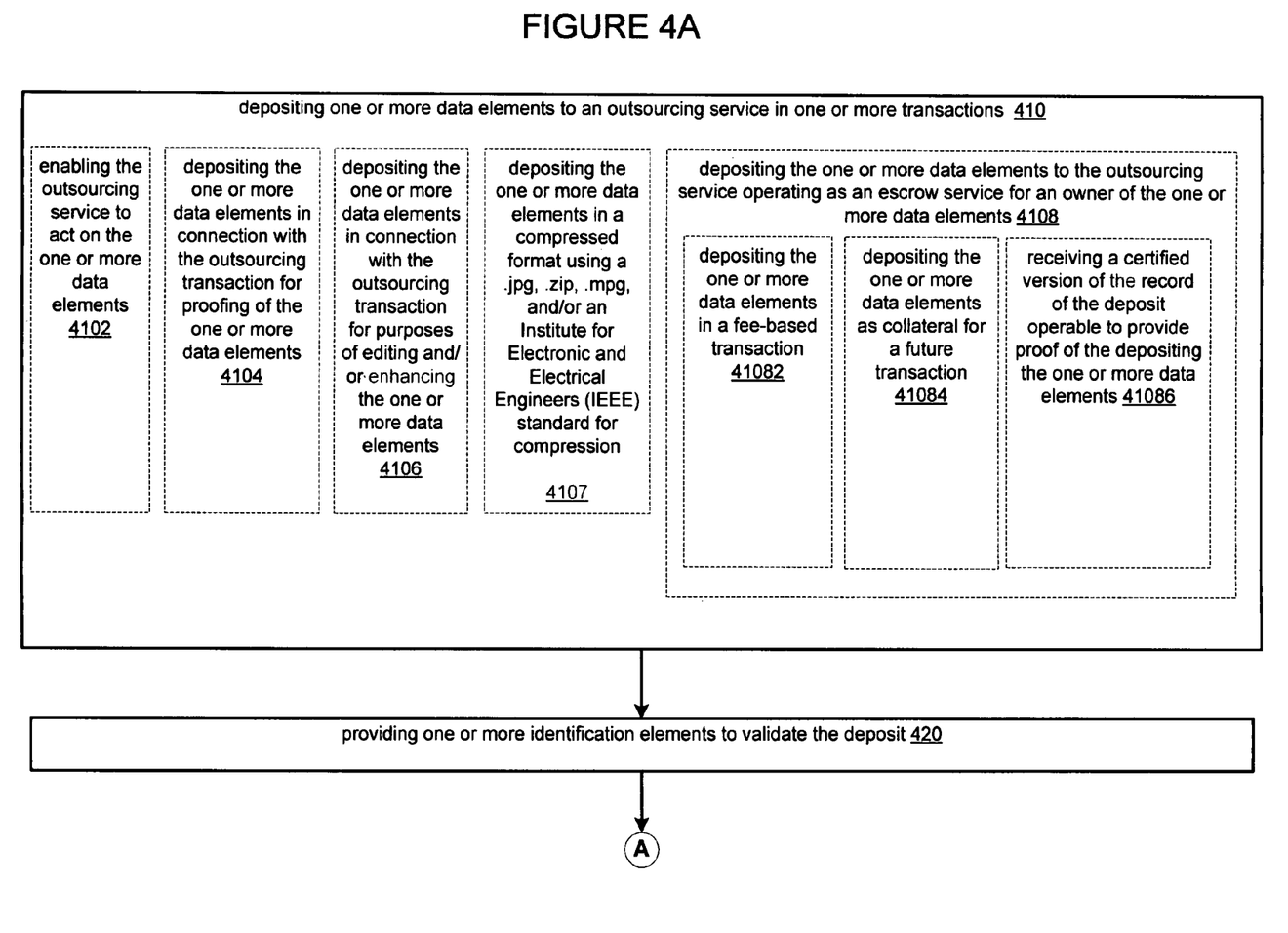
FIGS. 4A and 4B illustrate a flow diagram of an exemplary method in accordance with an embodiment of the subject matter of the present application.
Figure 4B:
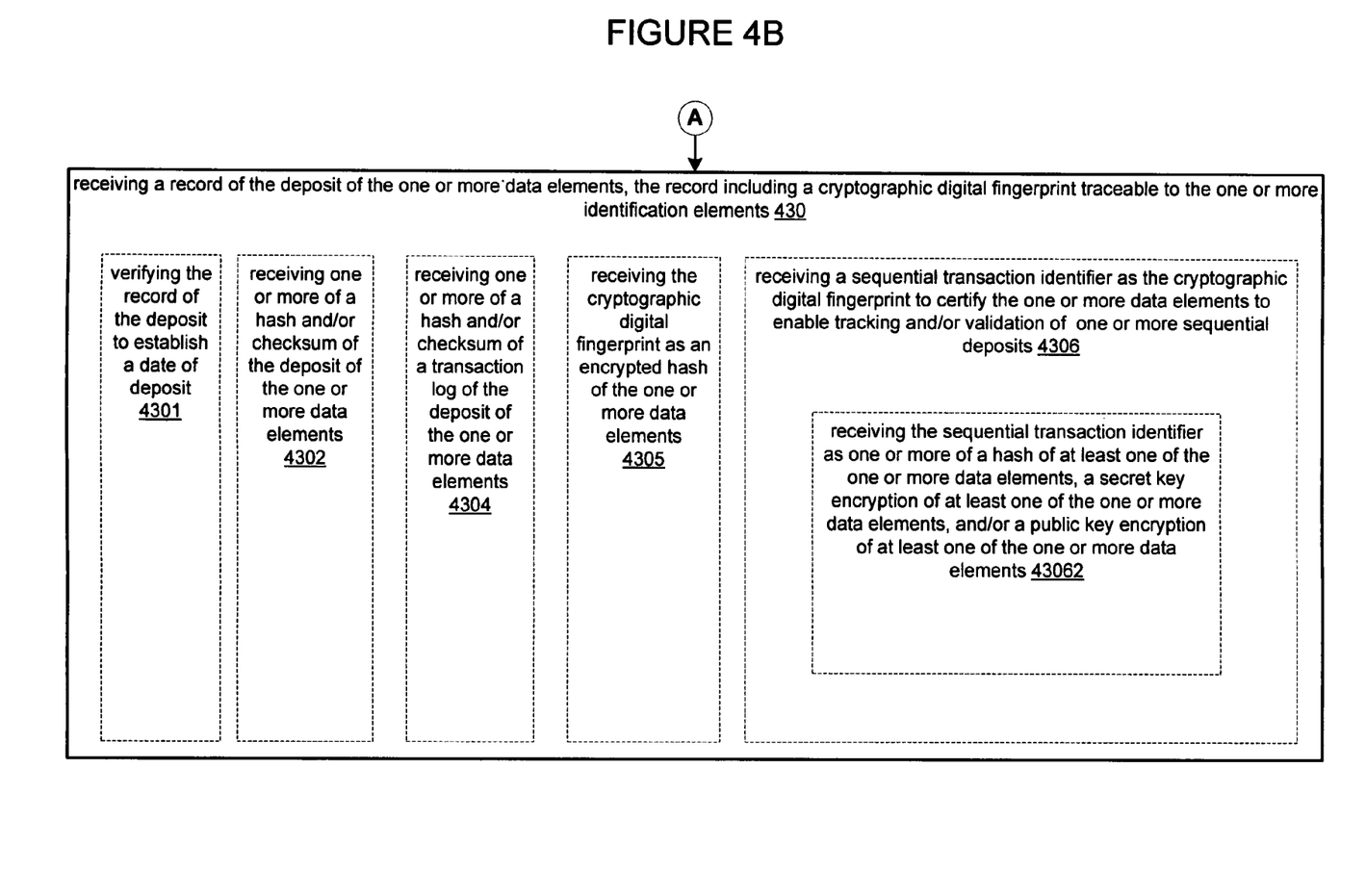

Referring now to FIGS. 4A and 4B, an exemplary flow diagram illustrates another method for verifying outsourced data in accordance with an embodiment of the present application. The method can be, for example, for a third party depositor of outsourced data.

Specifically, referring to FIG. 4A, block 410 provides for depositing one or more data elements to an outsourcing service in one or more transactions (e.g., storage facility 230 or third party 273 depositing data elements 201 or 296 with certification system 200). Depicted within block 410 is optional block 4102 which provides for enabling the outsourcing service to act on the one or more data elements (e.g., certification system 200 enabling storage facility 230 to act on data elements 201 or 296). Depicted within block 410 is optional block 4104 which provides for depositing the one or more data elements in connection with the outsourcing transaction for proofing of the one or more data elements (e.g., third party 273 or storage facility 230 depositing data elements 201, 296 as part of an outsourcing transaction 202 to enable proofing of data elements 201).

As further illustrated in FIG. 4A, depicted within block 410 is optional block 4106 which provides for depositing the one or more data elements in connection with the outsourcing transaction for purposes of editing and/or enhancing the one or more data elements (e.g., third party 273 or storage facility 230 depositing data elements 201, 296 in a compressed format). Depicted within block 410 is optional block 4107 which provides for depositing the one or more data elements in a compressed format using a .jpg, .zip, .mpg, and/or an Institute for Electronic and Electrical Engineers (IEEE) standard for compression (e.g., third party 273 or storage facility 230 depositing data elements 201, 296 in a compressed format).

Referring to FIG. 4A, also depicted within block 410 is block 4108 which provides for depositing the one or more data elements to the outsourcing service operating as an escrow service for an owner of the one or more data elements (e.g., third party 273 or storage facility 230 depositing data elements 201, 296 so that certification system 200 can operate as an outsourcing service escrow service for an owner of data elements 201).

Depicted within block 4108 is optional block 41082 which provides for depositing the one or more data elements in a fee-based transaction (e.g., third party 273 or storage facility 230 depositing data elements 201, 296 in outsourcing transaction 202 as a fee-based transaction). Also depicted within block 4108 is optional block 41084 which provides for depositing the one or more data elements as collateral for a future transaction (e.g., third party 273 or storage facility 230 depositing data elements 201, 296 as collateral for a future transaction 202). Also depicted within block 4108 is optional block 41086 which provides for receiving a certified version of the record of the deposit operable to provide proof of the depositing the one or more data elements (e.g., third party 273 or storage facility 230 depositing data elements 201, 296 and receiving from certification system 200 a certified version of a record of the deposit via cryptographic module 290).

FIG. 4A further depicts block 420 providing one or more identification elements to validate the deposit (e.g., third party 273 providing identification 271 to validate a deposit 201, 296).

Referring now to FIG. 4B, the illustrative flow diagram continues. Block 430 provides for receiving a record of the deposit of the one or more data elements, the record including a cryptographic digital fingerprint traceable to the one or more identification elements (e.g., third party 273 receiving validation record 260 of data elements 201 or 296 created by cryptographic module 290 that is traceable to identification 271). Depicted within block 430 is optional block 4301, which provides for verifying the record of the deposit to establish a date of deposit (e.g., third party 273 establishing the data of deposit of data elements 201 using validation record 260 and/or transaction log 250). Depicted within block 430 is optional block 4302, which provides for receiving one or more of a hash and/or checksum of the deposit of the one or more data elements (e.g., third party 273 receiving a hash/checksum or the like of a deposit of data elements 201, or 296).

Depicted within block 430 is optional block 4304, which provides for receiving one or more of a hash and/or checksum of a transaction log of the deposit of the one or more data elements (e.g., third party 273 or storage facility 230 receiving a hash/checksum of transaction log 250 of data elements 201 and/or 296). Depicted within block 430 is optional block 4305, which provides for receiving the cryptographic digital fingerprint as an encrypted hash of the one or more data elements (e.g., third party 273 or storage facility 230 receiving a cryptographic digital fingerprint from digital fingerprint module 295 as a hash/checksum of transaction log 250 or data elements 201 and/or 296).

As further illustrated in FIG. 4B, depicted within block 430 is optional block 4306, which provides for receiving a sequential transaction identifier as the cryptographic digital fingerprint to certify the one or more data elements to enable tracking and/or validation of one or more sequential deposits (e.g., third party 273 or storage facility 230 receiving a sequential transaction identifier produced by sequential transaction identifier module 294 and by digital fingerprint module 295 to certify the data elements 201 and/or 296 to enable tracking and validation of sequential deposits 296). Depicted within block 4306 is optional block 43062, which provides for receiving the sequential transaction identifier as one or more of a hash of at least one of the one or more data elements, a secret key encryption of at least one of the one or more data elements, and/or a public key encryption of at least one of the one or more data elements (e.g., third party 273 or storage facility 230 receiving a sequential transaction identifier produced by sequential transaction identifier module 294 as a hash of data elements 201, 296, and/or secret key or public key encryption by cryptographic module 290).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for verifying outsourced data, the method comprising:
   receiving a deposit of one or more data elements in connection with an outsourcing transaction;
   receiving an identification of a depositor associated with the outsourcing transaction;
   maintaining a transaction log to provide a validation record acknowledging the outsourcing transaction;
   performing one or more cryptographic actions using a public key encryption on the received identification of the depositor to verify an authorization of the depositor;
   producing a certified version of the transaction log using the public key encryption as at least a portion of the certification process;
   maintaining a statistical failure rate associated with producing the certified version of the transaction log at least partially based on a rate of success associated with the one or more performed cryptographic actions on the received identification of the depositor;
   establishing a deposit history, including at least pricing the outsourcing transaction at least as a function of (i) an amount of data included in the deposit and the statistical failure rate associated with producing the certified version of the transaction log;
   receiving a query related to the pricing of the outsourcing transaction from an authorized party;
   providing the validation record of the certified version of the transaction log, including at least enabling an authorized party associated with the received query to use the public key encryption to establish proof of the deposit via the validation record, the proof traceable to the identification of the depositor; and
   receiving an indication of the authorized party using the public key encryption to establish proof of the deposit of the one or more data elements via the validation record,
   wherein at least one of the receiving a deposit, receiving an identification, maintaining a transaction log, performing one or more cryptographic actions, producing a certified version of the transaction log, maintaining a statistical failure rate, establishing a deposit history, receiving a query, providing the validation record, or receiving an indication of the authorized party using the public key encryption is at least partially implemented using at least one processing device.

2. A system for verifying outsourced data, comprising:
   means for receiving a deposit of one or more data elements in connection with an outsourcing transaction, including at least receiving an identification associated with a depositor of the one or more data elements;
   means for performing a checksum of the one or more data elements;
   means for storing the one or more data elements including at least storing the checksum of the one or more data elements;
   means for maintaining a transaction log to provide a validation record acknowledging receipt of the deposit;
   means for performing one or more cryptographic actions using a public key encryption on one or more aspects of the outsourcing transaction, including at least:
      means for performing the one or more cryptographic actions using the public key encryption on the received identification associated with the depositor to verify an authorization of the depositor;
      means for performing the one or more cryptographic actions using the public key encryption on the checksum of the one or more data elements; and
      means for performing a hash on the transaction log to create a digital fingerprint traceable to the received identification;
   means for producing a certified version of the transaction log in accordance with the performing the one or more cryptographic actions using the public key encryption, including at least (a) the cryptographic action on the received identification associated with the depositor, (b) the cryptographic action on the checksum of the one or more data elements, and (c) the hash of the transaction log as at least a portion of the certification process;
   means for utilizing a rate of success associated with the one or more performed cryptographic actions using the public key encryption on the received identification associated with the depositor and on the checksum of the one or more data elements to at least one of store or update a statistical failure rate associated with producing the certified version of the transaction log;
   means for establishing a deposit history, including at least pricing the outsourcing transaction at least as a function of (i) an amount of data included in the deposit, (ii) a number of certified versions of transaction logs produced, and (iii) the statistical failure rate associated with producing the certified version of the transaction log, wherein the pricing of the outsourcing transaction is correlated with the statistical failure rate such that one or more failures of cryptographic actions on the received identification associated with the depositor results in higher pricing of the outsourcing transaction than a transaction with no failures of cryptographic actions;
   means for providing the validation record of the certified version of the transaction log in response to a received query associated with the depositor, the received query related to the pricing of the outsourcing transaction; and means for receiving an indication of an authorized party associated with the received query using the public key encryption to establish proof of the deposit with the provided validation record, the proof traceable based on the digital fingerprint to the identification associated with the depositor of the one or more data elements, wherein at least one of the means for receiving a deposit, performing a checksum, storing the one or more data elements, maintaining a transaction log, performing one or more cryptographic actions, producing a certified version of the transaction log, utilizing a rate of success to at least one of store or update, establishing a deposit history, providing the validation record, or receiving an indication is at least partially implemented using at least one processing device.

3. A system for verifying outsourced data, comprising:

circuitry for receiving a deposit of one or more data elements in connection with an outsourcing transaction, including at least receiving an identification associated with a depositor of the one or more data elements;

circuitry for performing a checksum of the one or more data elements;

circuitry for storing the one or more data elements including at least storing the checksum of the one or more data elements;

circuitry for maintaining a transaction log to provide a validation record acknowledging receipt of the deposit;

circuitry for performing one or more cryptographic actions using a public key encryption on one or more aspects of the outsourcing transaction, including at least:
  circuitry for performing the one or more cryptographic actions using the public key encryption on the received identification associated with the depositor to verify an authorization of the depositor;
  circuitry for performing the one or more cryptographic actions using the public key encryption on the checksum of the one or more data elements; and
  circuitry for performing a hash on the transaction log to create a digital fingerprint traceable to the received identification;

circuitry for producing a certified version of the transaction log in accordance with the performing the one or more cryptographic actions using the public key encryption, including at least (a) the cryptographic action on the received identification associated with the depositor, (b) the cryptographic action on the checksum of the one or more data elements, and (c) the hash of the transaction log as at least a portion of the certification process;

circuitry for utilizing a rate of success associated with the one or more performed cryptographic actions using the public key encryption on the received identification associated with the depositor and on the checksum of the one or more data elements to at least one of store or update a statistical failure rate associated with producing the certified version of the transaction log;

circuitry for establishing a deposit history, including at least pricing the outsourcing transaction at least as a function of (i) an amount of data included in the deposit, (ii) a number of certified versions of transaction logs produced, and (iii) the statistical failure rate associated with producing the certified version of the transaction log, wherein the pricing of the outsourcing transaction is correlated with the statistical failure rate such that one or more failures of cryptographic actions on the received identification associated with the depositor results in higher pricing of the outsourcing transaction than a transaction with no failures of cryptographic actions;

circuitry for providing the validation record of the certified version of the transaction log in response to a received query associated with the depositor, the received query related to the pricing of the outsourcing transaction; and circuitry for receiving an indication of an authorized party associated with the received query using the public key encryption to establish proof of the deposit with the provided validation record, the proof traceable based on the digital fingerprint to the identification associated with the depositor of the one or more data elements.

4. The system of claim 3, wherein circuitry for receiving a deposit of one or more data elements in connection with an outsourcing transaction, including at least receiving an identification associated with a depositor of the one or more data elements comprises:

circuitry for receiving the deposit of the one or more data elements by a registry service, the registry service operating a certification system to receive data elements.

5. The system of claim 3, wherein circuitry for receiving a deposit of one or more data elements in connection with an outsourcing transaction, including at least receiving an identification associated with a depositor of the one or more data elements comprises:

circuitry for receiving the deposit of the one or more data elements in connection with the outsourcing transaction for at least one of storage purposes or archiving purposes.

6. The system of claim 3, wherein circuitry for receiving a deposit of one or more data elements in connection with an outsourcing transaction, including at least receiving an identification associated with a depositor of the one or more data elements comprises:

circuitry for receiving the deposit of the one or more data elements in connection with the outsourcing transaction for purposes of at least one of editing or enhancing the one or more data elements.

7. The system of claim 3, wherein circuitry for receiving a deposit of one or more data elements in connection with an outsourcing transaction, including at least receiving an identification associated with a depositor of the one or more data elements comprises:

circuitry for receiving the deposit of the one or more data elements in connection with the outsourcing transaction to enable a third party service to act on the one or more data elements.

8. The system of claim 3, wherein circuitry for receiving a deposit of one or more data elements in connection with an outsourcing transaction, including at least receiving an identification associated with a depositor of the one or more data elements comprises:

circuitry for receiving the one or more data elements in a compressed format.

9. The system of claim 8, wherein circuitry for receiving the one or more data elements in a compressed format comprises:

circuitry for receiving the one or more data elements in the compressed format as one or more of compressed text data, compressed image data, compressed video data, compressed audio data, or compressed media data.

10. The system of claim 3, wherein circuitry for receiving a deposit of one or more data elements in connection with an outsourcing transaction, including at least receiving an identification associated with a depositor of the one or more data elements comprises:

circuitry for receiving the deposit of the one or more data elements by a copyright maintenance service.

11. The system of claim 3, wherein circuitry for performing one or more cryptographic actions using a public key encryption on one or more aspects of the outsourcing transaction comprises:
circuitry for verifying the authorization of the depositor using a stored code uniquely identifying the depositor.

12. The system of claim 3, wherein circuitry for maintaining a transaction log to provide a validation record acknowledging receipt of the deposit comprises:
circuitry for maintaining tracking data including one or more of date, identity, data packet size, or source data, the tracking data configured as metadata for the transaction log.

13. The system of claim 3, wherein circuitry for performing one or more cryptographic actions using a public key encryption on one or more aspects of the outsourcing transaction comprises:
circuitry for performing one or more cryptographic actions on the received identification associated with the depositor and, if a failure of the one or more cryptographic actions occurs, signaling a rate of success related to the one or more cryptographic actions.

14. The system of claim 3, wherein circuitry for performing one or more cryptographic actions using a public key encryption on one or more aspects of the outsourcing transaction comprises:
circuitry for performing one or more cryptographic actions on the received identification associated with the depositor at least partially based on at least one of a private key or a public key associated with the depositor.

15. The system of claim 3, wherein circuitry for performing a hash on the transaction log to create a digital fingerprint traceable to the received identification comprises:
circuitry for computing a hash value of the one or more deposits for at least one of storage or the transaction log; and
circuitry for encrypting the hash value with a cryptographic key.

16. The system of claim 3, wherein circuitry for producing a certified version of the transaction log in accordance with the performing the one or more cryptographic actions using the public key encryption, including at least (a) the cryptographic action on the received identification associated with the depositor, (b) the cryptographic action on the checksum of the one or more data elements, and (c) the hash of the transaction log as at least a portion of the certification process comprises:
circuitry for documenting the deposit of one or more data elements for purposes of assessing a fee for the outsourcing transaction; and
circuitry for assessing the fee associated with receiving the deposit at least partially based on the documenting;
circuitry for producing a fee log including at least the assessed fee; and
circuitry for providing the validation record at least partially based on the produced fee log.

17. The system of claim 3, wherein circuitry for receiving a deposit of one or more data elements in connection with an outsourcing transaction, including at least receiving an identification associated with a depositor of the one or more data elements comprises:
circuitry for documenting the deposit of the one or more data elements for purposes of assessing a fee for the outsourcing transaction.

18. The system of claim 3, wherein circuitry for receiving a deposit of one or more data elements in connection with an outsourcing transaction, including at least receiving an identification associated with a depositor of the one or more data elements comprises:
circuitry for receiving the deposit of the one or more data elements in connection with the outsourcing transaction for proofing of the one or more data elements.

19. The system of claim 3, wherein circuitry for receiving a deposit of one or more data elements in connection with an outsourcing transaction, including at least receiving an identification associated with a depositor of the one or more data elements comprises:
circuitry for receiving the one or more data elements in a compressed format using at least one standard for file compression.

20. The system of claim 3, wherein circuitry for receiving a deposit of one or more data elements in connection with an outsourcing transaction, including at least receiving an identification associated with a depositor of the one or more data elements comprises:
circuitry for receiving the deposit as an escrow service for an owner of the one or more data elements.

21. The system of claim 20, wherein circuitry for receiving the deposit as an escrow service for an owner of the one or more data elements comprises:
circuitry for receiving the deposit for the escrow service as a fee-based transaction.

22. The system of claim 20, wherein circuitry for receiving the deposit as an escrow service for an owner of the one or more data elements comprises:
circuitry for receiving the deposit as collateral for a future transaction; and
circuitry for receiving the certified version of the transaction log to provide proof of the one or more deposits.

23. The system of claim 3, wherein circuitry for performing one or more cryptographic actions using a public key encryption on one or more aspects of the outsourcing transaction comprises:
circuitry for performing one or more cryptographic actions using a checksum of at least one of the one or more data elements or the transaction log and an identification of a third party to produce the certified version of the transaction log.

24. The system of claim 3, wherein circuitry for performing one or more cryptographic actions using a public key encryption on one or more aspects of the outsourcing transaction comprises:
circuitry for enabling access of the certified version of the transaction log to at least one of a third party or a party authorized by an owner of the certified transaction log.

25. The system of claim 3, wherein circuitry for providing the validation record of the certified version of the transaction log in response to a received query associated with the depositor, the received query related to the pricing of the outsourcing transaction comprises:
circuitry for enabling a depositor to use a decryption technique to establish proof of the deposit in response to a received query associated with the depositor, the received query related to the pricing of the outsourcing transaction.

26. The system of claim 3, wherein circuitry for performing one or more cryptographic actions using a public key encryption on one or more aspects of the outsourcing transaction comprises:
circuitry for performing one or more of a hash of the received identification or a secret key encryption of the received identification following use of a public key encryption of the received identification.

27. The system of claim 3, wherein circuitry for performing one or more cryptographic actions using a public key encryption on one or more aspects of the outsourcing transaction comprises:
   circuitry for performing one or more of a check function, a hash function checksum, or a hash of the deposit for at least one of storage or the transaction log.

28. The system of claim 3, wherein circuitry for maintaining a transaction log to provide a validation record acknowledging receipt of the deposit comprises:
   circuitry for maintaining a transaction log, the transaction log including at least some tracking data to confirm the outsourcing transaction, the tracking data including at least one or more of a date of deposit associated with the one or more data elements, a date of creation of the one or more data elements, one or more sources of the one or more data elements, one or more recipients of the data, or a description of the one or more data elements.

29. The system of claim 3, wherein circuitry for performing one or more cryptographic actions using a public key encryption on one or more aspects of the outsourcing transaction comprises:
   circuitry for performing one or more cryptographic actions on the received identification, including at least maintaining one or more statistics related to at least one of success or failure of the one or more cryptographic actions; and
   wherein circuitry for establishing a deposit history, including at least pricing the outsourcing transaction at least as a function of (i) an amount of data included in the deposit, (ii) a number of certified versions of transaction logs produced, and (iii) the statistical failure rate associated with producing the certified version of the transaction log includes at least:
      circuitry for pricing the outsourcing transaction at least partially based on the maintained one or more statistics.

30. The system of claim 3, wherein circuitry for producing a certified version of the transaction log in accordance with the performing the one or more cryptographic actions using the public key encryption, including at least (a) the cryptographic action on the received identification associated with the depositor, (b) the cryptographic action on the checksum of the one or more data elements, and (c) the hash of the transaction log as at least a portion of the certification process comprises:
   circuitry for producing a certified version of the transaction log, including at least maintaining a statistical failure rate associated with producing the certified version of the transaction log at least partially based on a rate of success associated with the one or more performed cryptographic actions on the received identification associated with the depositor;
   circuitry for generating an index associated with the validation record; and
   circuitry for exposing the generated index for access by the depositor.

31. The system of claim 3, wherein circuitry for providing the validation record of the certified version of the transaction log in response to a received query associated with the depositor, the received query related to the pricing of the outsourcing transaction comprises:
   circuitry for providing the validation record of the certified version of the transaction log in response to a received query associated with the depositor, the provided validation record at least partially indicative of the statistical failure rate associated with the performing one or more cryptographic actions.

32. The system of claim 3, wherein circuitry for providing the validation record of the certified version of the transaction log in response to a received query associated with the depositor, the received query related to the pricing of the outsourcing transaction comprises:
   circuitry for providing the validation record of the certified version of the transaction log in response to a received query associated with the depositor, the provided validation record at least partially indicative of the statistical failure rate associated with the performing the one or more cryptographic actions on the received identification associated with the depositor.

33. The system of claim 3, wherein circuitry for performing a checksum of the one or more data elements comprises:
   circuitry for performing a hash function checksum of the one or more data elements.

34. The system of claim 3, wherein circuitry for receiving a deposit of one or more data elements in connection with an outsourcing transaction, including at least receiving an identification associated with a depositor of the one or more data elements comprises:
   circuitry for receiving, at least partially via the Internet, a deposit of one or more data elements in connection with an outsourcing transaction, including at least receiving an identification associated with a depositor of the one or more data elements; and
   wherein circuitry for storing the one or more data elements including at least storing the checksum of the one or more data elements includes at least:
      circuitry for accessing, at least partially via the Internet, a storage facility configured for receiving the one or more data elements and the checksum of the one or more data elements; and
      circuitry for storing the one or more data elements and the checksum of the one or more data elements.

35. The system of claim 3, wherein circuitry for storing the one or more data elements including at least storing the checksum of the one or more data elements comprises:
   circuitry for storing the one or more data elements, including at least storing the one or more data elements using a stored code uniquely identifying a third party associated with the depositor.

36. The system of claim 3, wherein circuitry for receiving a deposit of one or more data elements in connection with an outsourcing transaction, including at least receiving an identification associated with a depositor of the one or more data elements comprises:
   circuitry for matching a stored code in a database storing a plurality of stored codes of third parties permitted to make a deposit.

37. The system of claim 3, wherein circuitry for performing a hash on the transaction log to create a digital fingerprint traceable to the received identification comprises:
   circuitry for performing a hash on the transaction log to create a sequential transaction identifier as a cryptographic digital fingerprint to enable tracking of one or more sequential deposits.

* * * * *